United States Patent

Saito et al.

[11] Patent Number: 5,839,989
[45] Date of Patent: Nov. 24, 1998

[54] CONTROL SYSTEM FOR THROTTLE RELEASED SHIFTING BY SYNCHRONOUS THROTTLE CONTROL OF AN INTERNAL COMBUSTION ENGINES

[75] Inventors: Yoshiharu Saito; Kazutomo Sawamura; Tetsuya Ono, all of Wako, Japan

[73] Assignee: Honda Giken Kogyo Kabushiki Kaisha, Tokyo, Japan

[21] Appl. No.: 848,518

[22] Filed: Apr. 28, 1997

[30] Foreign Application Priority Data

Apr. 30, 1996 [JP] Japan .................................. 8-132776

[51] Int. Cl.$^6$ .................................................. F16H 59/30
[52] U.S. Cl. ........................ 477/143; 477/83; 74/336 R; 74/335
[58] Field of Search ................................ 477/83–85, 143, 477/154, 156, 158, 120; 74/335, 336 R; 701/66

[56] References Cited

U.S. PATENT DOCUMENTS

| | | | |
|---|---|---|---|
| 3,640,156 | 2/1972 | Mori et al. ................................. | 477/93 |
| 3,792,631 | 2/1974 | Mori ........................................ | 477/154 |
| 5,508,916 | 4/1996 | Markyvech et al. ................... | 74/335 X |
| 5,533,946 | 7/1996 | Markyvech ............................ | 74/335 X |
| 5,568,687 | 10/1996 | Andersson .......................... | 74/33 R X |
| 5,638,271 | 6/1997 | White et al. .............................. | 701/66 |
| 5,747,960 | 5/1998 | Quaggio ........................... | 74/336 R X |
| 5,754,968 | 5/1998 | Hedstrom ............................ | 477/121 X |

*Primary Examiner*—Khoi Q. Ta
*Attorney, Agent, or Firm*—Armstrong, Westerman, Hattori, McLeland & Naughton

[57] ABSTRACT

An automatic transmission of an automotive vehicle is set into a neutral position in response to a command instructing gear shifting of the automatic transmission when release of an accelerator pedal of the vehicle is detected. The automatic transmission has a plurality of speed clutches. The opening of a throttle valve arranged in an intake passage of an internal combustion engine installed on the vehicle is controlled such that the rotational speed of an input side of one of the speed clutches to be selected for the gear shifting and the rotational speed of the one of the speed clutches becomes substantially equal to each other when the automatic transmission is held in the neutral position. The one of the speed clutches is engaged upon detection that the rotational speed of the input side thereof and the rotational speed of the output side thereof becomes substantially equal to each other.

4 Claims, 6 Drawing Sheets

CONTROL SYSTEM FOR THROTTLE RELEASED SHIFTING BY SYNCHRONOUS THROTTLE CONTROL OF AN INTERNAL COMBUSTION ENGINES

BACKGROUND OF THE INVENTION

1. Field of the Invention

This invention relates to a control system for internal combustion engines for automotive vehicles, and more particularly to a control system of this kind which is capable of reducing a shock caused by gear shifting carried out upon or during release of an accelerator pedal of the vehicle.

2. Prior Art

Conventionally, in an automatic vehicle with an automatic transmission, the gear shift position of the transmission is automatically shifted when a sharp change in the position of the accelerator pedal toward a lesser stepping-on amount thereof is detected during traveling of the vehicle (gear shifting responsive to release of the accelerator pedal).

When an upshift is carried out in response to release of the accelerator pedal, hydraulic pressure for operating a target speed position clutch (i.e. a clutch to be engaged through the gear shifting) is set to a low level at the start of the gear shifting so as to reduce a shock caused by the upshift.

FIGS. 1A to 1E show changes in a gear shifting command, throttle valve opening TH, engine rotational speed NE, the driving force of the vehicle, and hydraulic pressures for operating a formerly selected clutch (i.e. a clutch engaged before the gear shifting) and the target speed position clutch of the automatic transmission, respectively, which take place when an upshift is carried out in response to release of the accelerator pedal.

As shown in the figures, when the throttle valve opening TH is sharply decreased upon release of the accelerator pedal, a gear shifting command is issued (time point t1). Accordingly, the hydraulic pressure for operating the formerly selected clutch is progressively reduced, whereby the formerly selected clutch starts to be disengaged, while the hydraulic pressure for operating the target speed position clutch is progressively increased, whereby the target speed position clutch starts to be engaged. In the process of the upshift, before the formerly selected clutch becomes completely disengaged, the driving force of the vehicle sharply drops due to a sudden decrease in the output torque of the engine caused by the release of the accelerator pedal (a state in which so-called engine brake is applied), and then progressively rises to a value of 0 G as the disengagement of the formerly selected clutch and the engagement of the target speed position clutch proceed.

On the other hand, when a downshift is carried out during release of the accelerator pedal, the output torque of the engine is temporarily increased through increase of the throttle valve opening TH by a drive-by-wire (DBW) system, etc. to reduce a shock caused by the downshift, in addition to the control of hydraulic pressure supplied to a target speed position clutch.

FIGS. 2A to 2D show changes in the gear shifting command, the throttle valve opening TH, the driving force of the vehicle, and hydraulic pressures for operating a formerly selected clutch and a target speed position clutch, respectively, which take place when a downshift is carried out during release of the accelerator.

As shown in the figures, when a gear shifting command is issued during release of the accelerator pedal (time point t1'), the hydraulic pressure for operating the formerly selected clutch is progressively decreased, whereby the formerly selected clutch starts to be disengaged, while the hydraulic pressure for operating the target speed position clutch is progressively increased, whereby the target speed position clutch starts to be engaged. During the downshift, the driving force of the vehicle sharply drops while the target speed position clutch is being engaged, and this sudden drop of the driving force causes a shock. Therefore, to reduce such a shock caused by the downshift, the throttle valve opening TH is increased over a predetermined time period T coincident with the sharp drop of the driving force before the target speed position clutch becomes completely engaged (FIG. 2B).

Figure 1A:
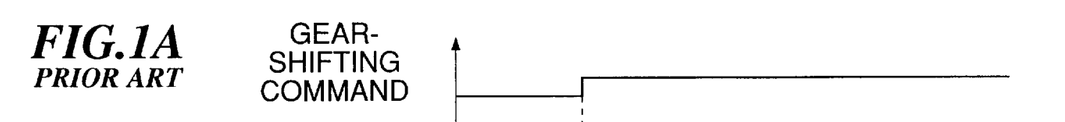
FIG. 1A shows a change in a gear shifting command.
Figures 1B, 1C:
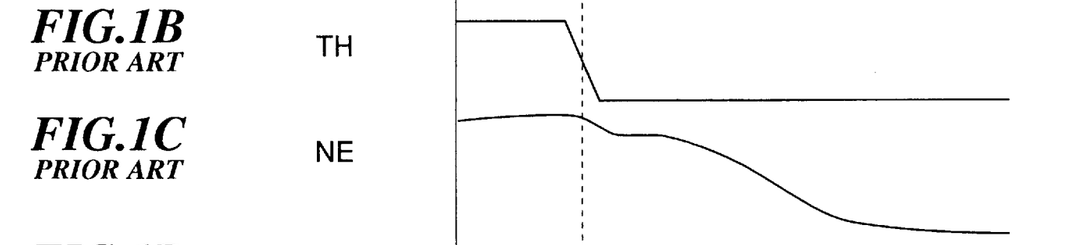
FIG. 1B shows a change in throttle valve opening TH.
FIG. 1C shows a change in engine rotational speed NE.
Figures 1D, 1E:
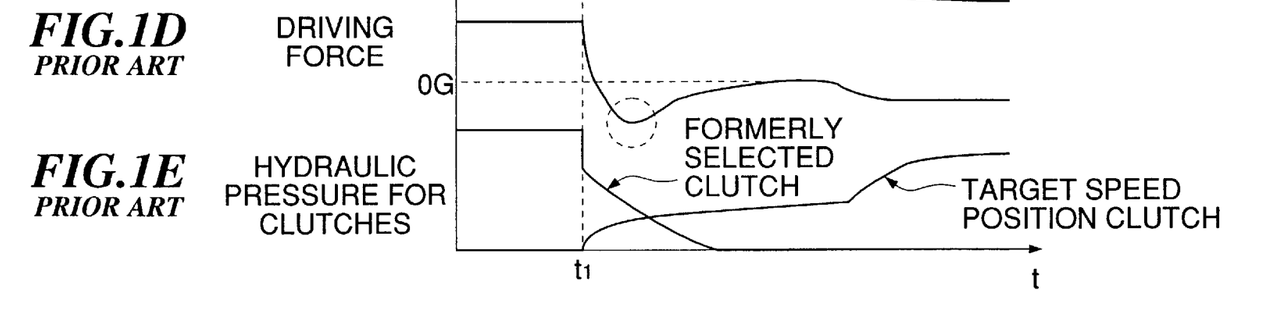
FIG. 1D shows a change in the driving force of the vehicle.
FIG. 1E shows changes in hydraulic pressures for operating a formerly selected clutch and a target speed position clutch.

As stated above, in an upshift responsive to release of the accelerator pedal, as shown in FIG. 1E, the hydraulic pressure for operating the target speed position clutch is progressively increased for reduction of a shock caused by the gear shifting. However, it is impossible to positively avoid a sudden drop in the driving force caused by a sharp decrease in the output torque of the engine due to release of the accelerator pedal.

Figures 2A, 2B:
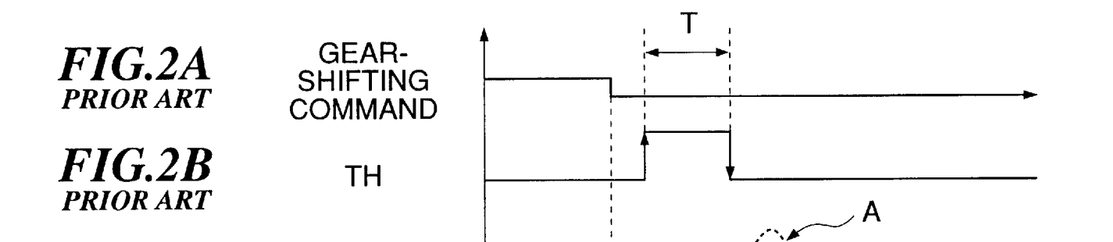
FIG. 2A shows a change in the gear shifting command.
FIG. 2B shows a change in the throttle valve opening TH.
Figures 2C, 2D:
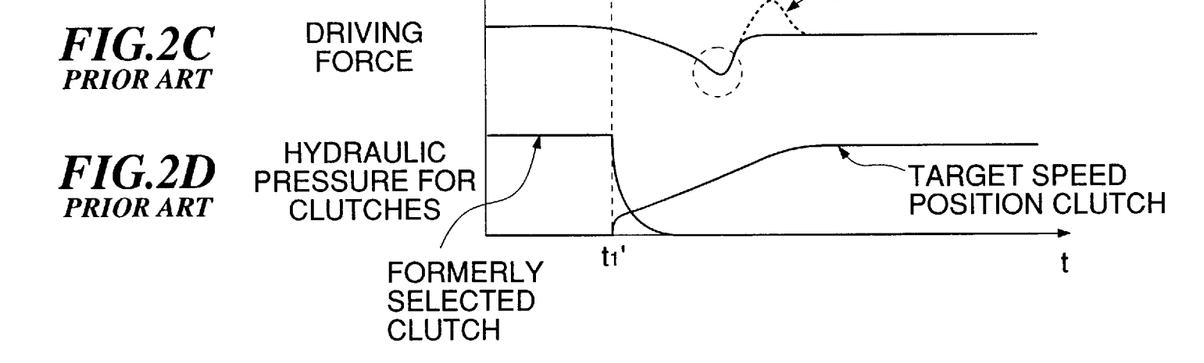
FIG. 2C shows a change in the driving force of the vehicle.
FIG. 2D shows changes in hydraulic pressures for operating a formerly selected clutch and a target speed position clutch.

Also, in a downshift during release of the accelerator pedal, it is difficult to completely preclude a drop of the driving force upon engagement of the target speed position clutch, even if the throttle valve opening TH is temporarily increased after the start of the gear shifting as shown in FIG. 2B. Further, when the throttle valve is closed too late, the driving force excessively rises as indicated by a broken line A in FIG. 2C, which gives such a shock as makes the driver feel that the vehicle jerks into motion upon engagement of the target speed position clutch.

SUMMARY OF THE INVENTION

It is the object of the present invention to provide a control system for internal combustion engines for automotive vehicles, which is capable of preventing a shock caused by gear shifting upon or during release of an accelerator pedal.

To attain the above object, the invention provides a control system for an internal combustion engine for an automotive vehicle, said vehicle having an accelerator pedal, and an automatic transmission, the automatic transmission having a plurality of speed clutches, the speed clutches each having an input side and an output side, the engine having an intake passage, and a throttle valve arranged in the intake passage.

The control system according to the invention is characterized by comprising:

accelerator position-detecting means for detecting release of the accelerator pedal;

command-issuing means for issuing a command instructing gear shifting of the automatic transmission;

neutral position-setting means responsive to the command issued by the command-generating means, for setting the automatic transmission into a neutral position when the accelerator position-detecting means detects the release of the accelerator pedal;

throttle valve opening control means for controlling opening of the throttle valve such that rotational speed of the output side of one of the speed clutches to be selected for the gear shifting and rotational speed of the input side thereof become substantially equal to each other, when the automatic transmission is held in the neutral position by the neutral position-setting means; and clutch control means operable upon detection that the rotational speed of the output side of the one of the speed clutches and the rotational speed of the input side thereof become substantially equal to each other, for engaging the one of the speed clutches.

Preferably, the clutch control means causes the one of the speed clutches to be engaged when a predetermined time period has elapsed after the detection that the rotational speed of the output side of the one of the speed clutches and the rotational speed of the input side thereof become substantially equal to each other.

Preferably, the neutral position-setting means instantly sets the automatic transmission into the neutral position by releasing hydraulic pressure applied to one of the speed clutches which is currently selected, when the command is issued by the command-issuing means.

Preferably, the clutch control means instantly causes the one of the speed clutches to be engaged by applying hydraulic pressure thereto when the predetermined time period has elapsed.

The above and other objects, features, and advantages of the invention will become more apparent from the following detailed description taken in conjunction with the accompanying drawings.

BRIEF DESCRIPTION OF THE DRAWINGS

FIGS. 1A to 1E collectively form a timing chart showing changes in engine operating parameters which take place when an upshift is carried out in response to release of an accelerator pedal of a vehicle, according to the prior art, in which:

FIGS. 2A to 2D collectively form a timing chart showing changes in engine operating parameters, which take place when a downshift is carried out during release of the accelerator pedal of the vehicle, according to the prior art, in which:

FIGS. 6A to 6G collectively form a timing chart showing changes in engine operating parameters when an upshift is carried out in response to release of the accelerator pedal of the vehicle, according to the embodiment, in which:

DETAILED DESCRIPTION

The invention will now be described in detail with reference to the drawings showing an embodiment thereof.

Figure 3:
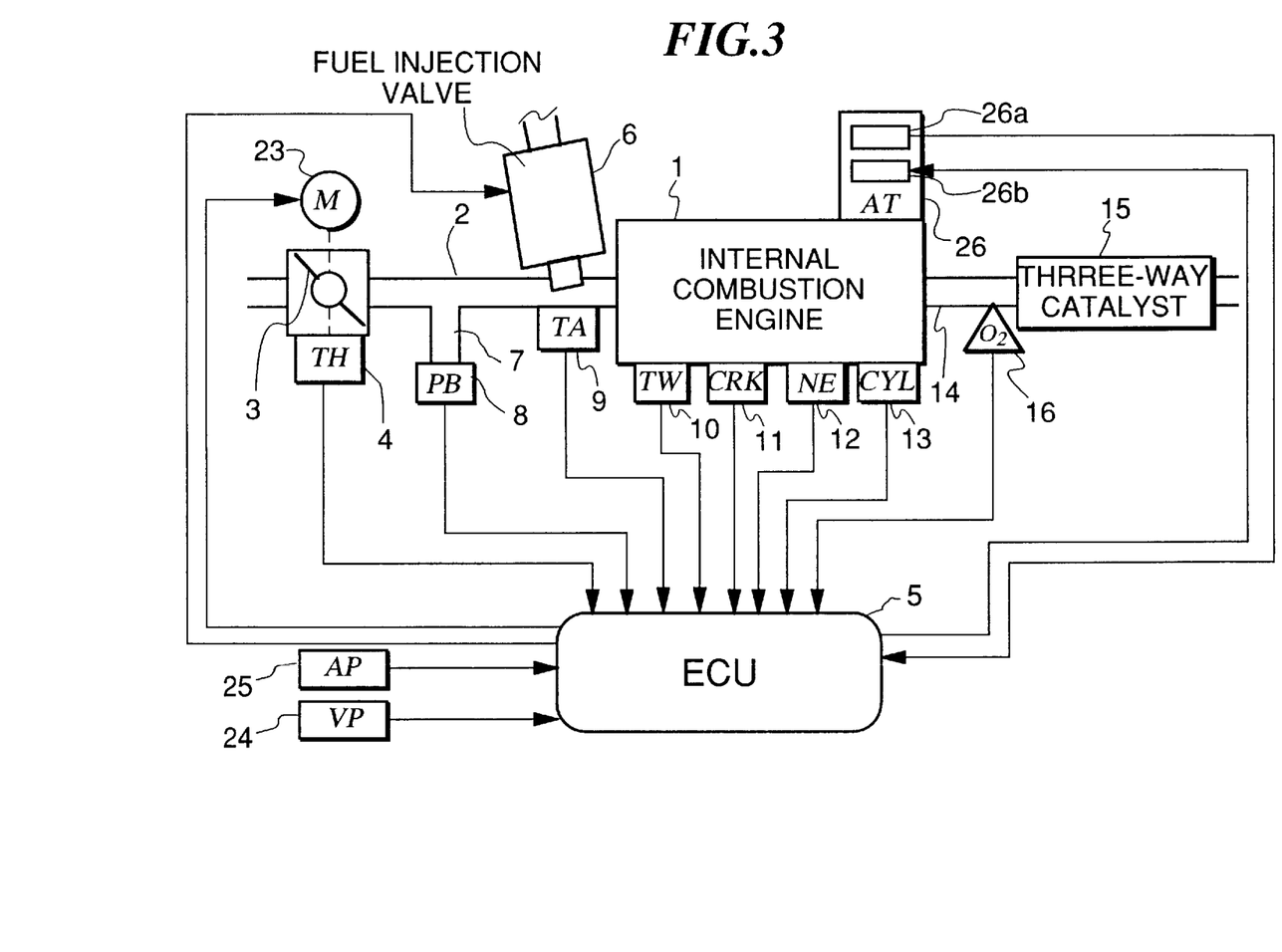
FIG. 3 is a block diagram schematically showing the whole arrangement of an internal combustion engine and a control system therefor, according to an embodiment of the invention.

Referring first to FIG. 3, there is illustrated the whole arrangement of an internal combustion engine (hereinafter simply referred to as "the engine") and a control system therefor, according to an embodiment of the invention. In the figure, reference numeral 1 designates an internal combustion engine for an automotive vehicle, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator opening (AP) sensor 25 for detecting the position or travel of an accelerator pedal, not shown, (hereinafter also referred to as "the accelerator opening"). The ECU 5 controls the operation of the throttle actuator 23 in response to the accelerator pedal position AP detected by the accelerator opening sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating (CYL) sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine. The NE sensor 12 generates a signal pulse (hereinafter referred to as "a TDC signal pulse") at each of predetermined crank angles (e.g. whenever the crankshaft rotates through 180 degrees when the engine is of the four-cylinder type) which each correspond to a predetermined crank angle before a top dead center (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

Further electrically connected to the ECU 5 is an automatic transmission 26 which is a conventional type and provided with a hydraulic pressure control circuit 26b for controlling the operations of a lockup clutch and a gear mechanism of the transmission, neither of which is shown, and a gear position sensor 26a for detecting the gear shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx.

An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) VP of the automotive vehicle in which the engine 1 is installed and supplying a signal indicative of the sensed vehicle speed VP to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit(hereinafter referred to as "the CPU"), memory means storing various operational programs which are executed by the CPU, and for storing results of calculations therefrom, etc., and an output circuit which supplies driving signals to the fuel injection valves 6, the throttle actuator 23, etc., and also supplies control signals to the hydraulic pressure control circuit 26b.

The CPU of the ECU 5 operates in response to signals from various engine operating parameter sensors including those mentioned above to determine operating conditions in which the engine 1 is operating, such as an air-fuel ratio feedback control region in which air-fuel ratio control of a mixture supplied to the engine 1 is carried out in response to oxygen concentration in exhaust gases detected by the O2 sensor 16, and air-fuel ratio open-loop control regions, and calculates, based upon the determined engine operating conditions, a fuel injection period TOUT for each of the fuel injection valves 6, in synchronism with generation of TDC signal pulses, by the use of the following equation (1):

$$TOUT = Ti \times KO2 \times K2 + K2 \quad (1)$$

where Ti represents a basic value of the fuel injection period TOUT, which is determined according to the engine rotational speed NE and the intake pipe absolute pressure PBA, by the use of a Ti map, not shown, stored in the memory means.

KO2 represents an air-fuel ratio correction coefficient calculated based on the output signal from the O2 sensor 16, which is calculated to such a value that the air-fuel ratio of the air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine is in these open-loop control regions.

K1 and K2 represent other correction coefficients and correction variables, respectively, which are set according to engine operating parameters to such values as optimize engine operating characteristics, such as fuel consumption and engine accelerability.

Driving signals corresponding to the fuel injection period TOUT calculated as above are delivered from the ECU 5 via the output circuit to the fuel injection valves 6 to drive them. Further, the CPU controls the engaged state of the lock-up clutch, the gear shift position of the gear mechanism, the valve opening TH of the throttle valve 3 in response to output signals from various engine operating parameter sensors.

Figure 4:
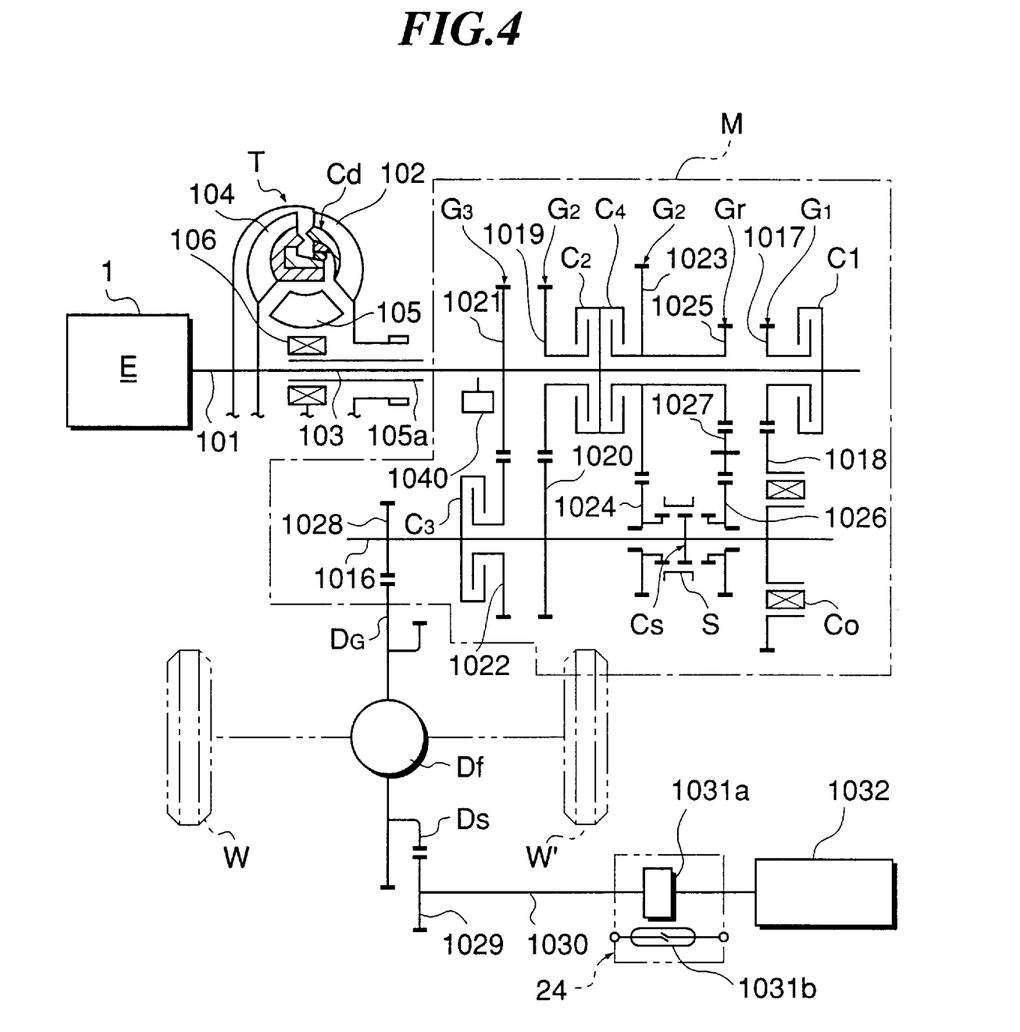
FIG. 4 is a diagram schematically showing the construction of an automatic transmission of the engine in FIG. 3.

FIG. 4 shows the construction of the automatic transmission 26. Output from the engine 1 is transmitted to left and right wheels W and W' of the vehicle through the crankshaft, 101 of the engine, a hydraulic torque converter T, an auxiliary transmission M, and a differential Df in the mentioned order.

The hydraulic torque converter T is comprised of a pump 102 coupled to the crankshaft 101, a turbine 104 coupled to an input shaft (main shaft) 103 of the auxiliary transmission M, and a stator 105 coupled, via a one-way clutch 106, to a stator shaft 105a which in turn is supported on the input shaft 103 for rotation relative thereto. Torque is transmitted from the crankshaft 101 to the pump 102, and then to the turbine 104 in a hydrodynamic manner. When amplification of torque takes place while torque is transmitted from the pump 102 to the turbine 104, the resulting reaction force is borne by the stator 105, as is already known.

A lock-up clutch Cd is interposed between the pump 102 and the turbine 104 for mechanically coupling them together.

The auxiliary transmission M has an output shaft (counter shaft) 1016 extending parallel with the input shaft 103, and is provided with a first-speed gear train G1, a second-speed gear train G2, a third-speed gear train G3, a fourth-speed gear train G4, and a reverse gear train Gr, all arranged in juxtaposition between the input and output shafts 103 and 1016. The first-speed gear train G1 is comprised of a driving gear 1017 connectible to the input shaft 103 through a first-speed clutch C1, and a driven gear 1018 connectible to the output shaft 1016 through a one-way clutch C0 and engaging with the driving gear 1017. The second-speed gear train G2 is comprised of a driving gear 1019 connectible to the input shaft 103 through a second-speed clutch C2, and a driven gear 1020 secured to the output shaft 1016 and engaging with the driving gear 1019, while the third-speed gear train G3 is comprised of a driving gear 1021 secured to the input shaft 103, and a driven gear 1022 connectible to the output shaft 1016 through a third-speed clutch C3 and engaging with the driving gear 1021. The fourth-speed gear train G4 is comprised of a driving gear 1023 connectible to the input shaft 103 through a fourth-speed clutch C4, and a driven gear 1024 connectible to the output shaft 1016 through a selector clutch Cs and engaging with the driving gear 1023. On the other hand, the reverse gear train Gr is comprised of a driving gear 1025 formed integrally with the driving gear 1023 of the fourth-speed gear train G4, a driven gear 1026 connectible to the output shaft 1016 through the selector clutch Cs, and an idle gear 1027 engaging with the gears 1025 and 1026. The selector clutch Cs is arranged between the driven gears 1024 and 1026 of the fourth-speed gear train G4, and has a selector sleeve S which is shiftable between a left or forward position and a right or reverse position as viewed in FIG. 3, to selectively connect the driven gear 1024 or the driven gear 1026 to the output shaft 1016. The one-way clutch C0 permits the driving torque from the engine 1 alone to be transmitted to the driving wheels W, W', while inhibiting transmission of torque from the driving wheels W, W' to the engine 1.

If the first-speed clutch C1 alone is engaged while the selector sleeve S is held in the forward position as illustrated in FIG. 3, the driving gear 1017 is connected to the input shaft 103 to establish the first-speed gear train G1, thereby allowing transmission of torque from the input shaft 103 to the output shaft 1016 therethrough. Then, if the second-speed clutch C2 is engaged with the first-speed clutch C1 maintained in its engaged state, the driving gear 1019 is connected to the input shaft 103 to establish the second-speed gear train G2 through which torque can be transmitted from the input shaft 103 to the output shaft 1016. That is, even while the first-speed clutch C1 is engaged, the second-speed gear train G2, the third-speed gear train G3 or the fourth-speed gear train G4 can be established by the action of the one-way clutch C0, rendering the first-speed gear train G1 approximately inoperative. If the second-speed clutch C2 is disengaged and the third-speed clutch C3 is engaged instead, the driven gear 1022 is connected to the output shaft 1016 to establish the third-speed gear train G3, while if the third-speed clutch C3 is disengaged and the fourth-speed clutch C4 is engaged instead, the driving gear 1023 is connected to the input shaft 103 to thereby establish the fourth-speed gear train G4. On the other hand, if the fourth-speed clutch C4 alone is engaged while the selector sleeve S of the selector clutch Cs is shifted to the right or reverse position, as viewed in FIG. 3, the driving gear 1025 and the driven gear 1026 are connected, respectively, to the input shaft 103 and the output shaft 1016 to establish the reverse gear train Gr, through which reverse torque is transmitted from the input shaft 103 to the output shaft 1016.

The torque transmitted to the output shaft 1016 is then transmitted through an output gear 1028 mounted on one end of the output shaft 1016 to an enlarged gear DG of the differential Df. A gear Ds is secured to the enlarged gear DG and engaged with a gear 1029, and a speedometer cable 1030 has one end thereof secured to the gear 1029 and the other end to a speedometer 1032 of the vehicle via a magnet 1031a of the vehicle speed sensor 24, respectively. The magnet 1031a is thus driven through the gears Ds and 1029 and the speedometer cable 1030 to indicate the traveling speed of the vehicle, while the vehicle speed sensor 24 is comprised of the aforementioned magnet 1031a, and a reed switch 1031b driven by the magnet 1031a, for instance. Rotation of the magnet 1031a in unison with the speedometer cable 1030 causes alternate closing and opening of the reed switch 1031b, and an on-off signal indicative of closing and opening of the reed switch 1031b is supplied to the ECU 5.

Arranged on the main shaft 103 is a rotational speed sensor 1040 of a magnetic pickup type for detecting the rotational speed Nm of the main shaft 103, an output signal of which is delivered to the ECU 5. An output signal indicative of the rotational speed Nc of the counter shaft 1016 obtained from the speedometer cable 1030 is also delivered to the ECU 5. The input/output rotational speed ratio ECL, i.e. the ratio of the counter shaft rotational speed Nc to the main shaft rotational speed Nm can be expressed as (NE×r)/Nm, where r represents the gear ratio between the main shaft 103 and the counter shaft 1016. The input/output rotational speed ratio ECL assumes 1.0 when there occurs no slip in the selected speed clutch, while it assumes a value less than 1.0 when a slip occurs in the selected speed clutch.

Figure 5:
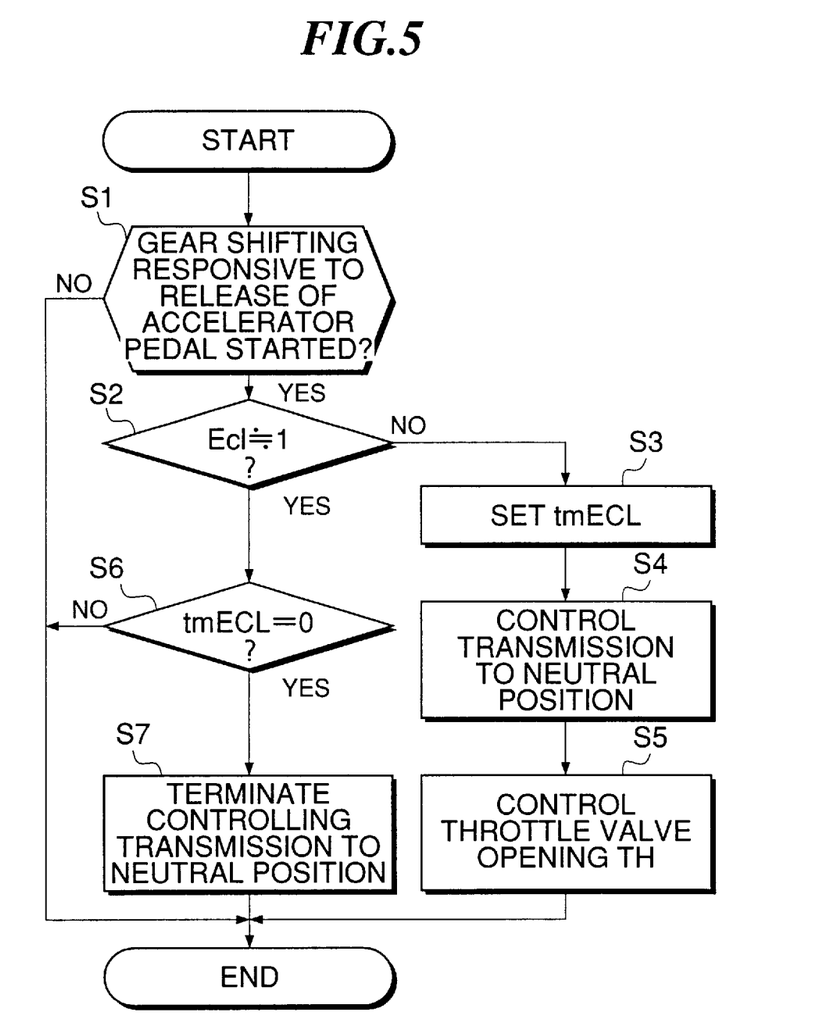
FIG. 5 is a flowchart showing a routine for carrying out gear-shifting control of the automatic transmission, which is executed by an ECU appearing in FIG. 3.
Figures 6A, 6B:
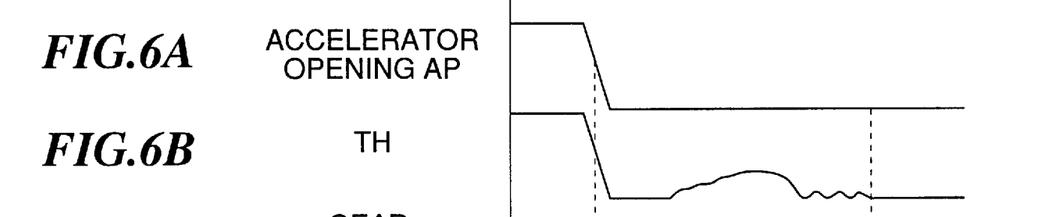
FIG. 6A shows a change in the position of an accelerator pedal (accelerator opening) AP.
FIG. 6B shows a change in the throttle valve opening TH.
Figures 6C, 6D, 6E:
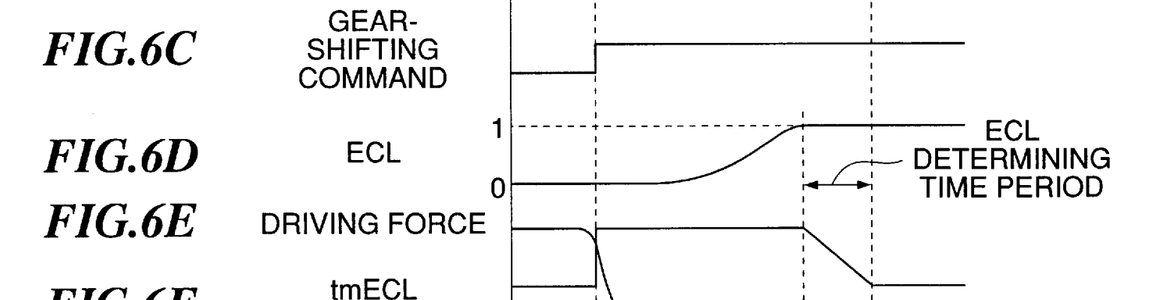
FIG. 6C shows a change in the gear shifting command.
FIG. 6D shows a change in the input/output rotational speed ratio ECL of the target speed position clutch.
FIG. 6E shows a change in the count of the ECL-determining timer tmECL.
Figures 6F, 6G:
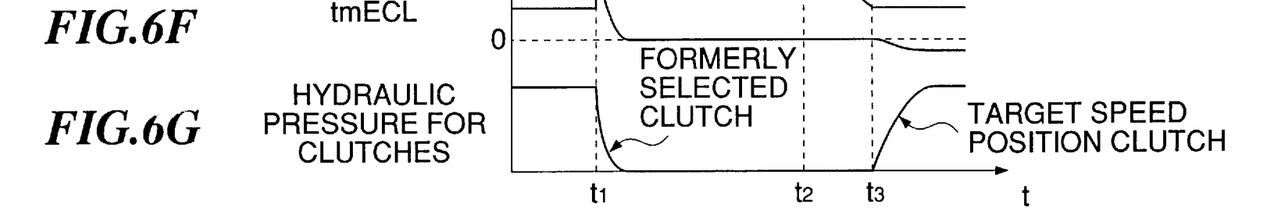
FIG. 6F shows a change in the driving force of the vehicle.
FIG. 6G shows changes in hydraulic pressures for operating the formerly selected clutch and the target speed position clutch.

FIG. 5 shows a routine for carrying out gear-shifting control of the automatic transmission 26, which is executed by the ECU 5. FIGS. 6A to 6G show the relationship in timing between the accelerator opening AP, the throttle valve opening TH, a gear shifting command, the input/output rotational speed ratio ECL of a target speed position clutch (i.e. a clutch to be engaged through gear shifting), an ECL-determining timer tmECL, the driving force of the vehicle, and hydraulic pressures for operating a formerly selected clutch and a target speed position clutch of the transmission, respectively, during an upshift responsive to release of the accelerator pedal.

First, at a step SI in FIG. 5, it is determined whether or not the gear shifting command for instructing an upshift has been issued in response to release of the accelerator pedal. This determination is carried out by determining whether or not a sharp decrease in the accelerator opening AP has been detected by the accelerator opening sensor 25 during traveling of the automotive vehicle.

If it is determined at the step SI that the gear shifting command has not been issued, the program is immediately terminated, whereas if it is judged that the gear shifting command has been issued (time point t1 in the timing chart of FIGS. 6A–6G), the program proceeds to a step S2, wherein it is determined whether or not an input/output rotational speed ratio of the target speed position clutch, i.e. the input/output rotational speed ratio ECL is approximately equal to "1". This determination is carried out by calculating the input/output rotational speed ratio ECL based on the signal indicative of the rotational speed Nm of the main shaft 103 and the signal indicative of the rotational speed Nc of the counter shaft 1016, by the use of the equation of ECL=(Nc×r)/Nm, as described above, wherein r in the present case represents a gear reduction ratio of the transmission 26 assumed when the target speed position is selected.

When this step S2 is first carried out, the input/output rotational speed ratio ECL is not approximately equal to "1", so that the program proceeds to a step S3, wherein the ECL-determining timer tmECL for measuring a time period for determination of the ECL value is set to a predetermined time period required for determining the input/output rotational speed ratio ECL of the target speed position clutch. Then, at a step S4, the automatic transmission 26 is set to a neutral position by disengaging the formerly selected clutch through release of hydraulic pressure applied thereto. Then, at a step S5, control of the throttle valve opening TH is started so as to make the input/output rotational speed ratio ECL assumed with the target speed position clutch engaged approximately equal to "1", followed by terminating the program.

On the other hand, if it is judged at the step S2 that the input/output rotational speed ratio ECL is approximately equal to "1" (time point t2), the program proceeds to a step S6, wherein it is determined whether or not the count of the ECL-determining timer tmECL set at the step S3 is equal to "0". If the count of the timer tmECL is not equal to "0", it is judged that the predetermined time period set for the ECL-determination has not elapsed, followed by terminating the program. If the count of the timer tmECL is equal to "0" (time point t3), it is judged that the predetermined time period set for the ECL-determination has elapsed, and then the program proceeds to a step S7, wherein hydraulic pressure is applied to the target speed position clutch to thereby engage the same.

As described above, according to the present embodiment, when an upshift is carried out in response to release of the accelerator pedal, the automatic transmission is set to the neutral position by instantly releasing hydraulic pressure applied to a formerly selected clutch, and the input/output rotational speed ratio ECL is made approximately equal to "1" by controlling the throttle valve opening TH, and thereafter, hydraulic pressure is applied to a target speed position clutch to thereby engage the same. This makes it possible to completely prevent a shock caused by gear shifting upon release of the accelerator pedal.

Although the above described embodiment is directed to control where an upshift responsive to release of the accelerator pedal is carried out, similar control may be carried out in a downshift during release of the accelerator pedal. More specifically, when a gear shifting command is issued during release of the accelerator pedal, hydraulic pressure applied to the formerly engaged clutch is promptly relieved to disengage the same to bring the automatic transmission into the neutral position before the input/output rotational speed ratio of the target speed position clutch, i.e. the input/ rotational speed ratio ECL becomes approximately equal to "1", then the throttle valve opening TH is controlled so as to make the input/output rotational speed ratio ECL become approximately equal to "1", and upon the lapse of a predetermined time period after the input/output rotational speed ratio ECL becomes approximately equal to "1", hydraulic pressure is applied to the target speed position clutch to engage the same. It is thus possible to prevent a shock caused by a downshift during release of the accelerator pedal as well.

What is claimed is:

1. A control system for an internal combustion engine for an automotive vehicle, said vehicle having an accelerator pedal, and an automatic transmission, said automatic transmission having a plurality of speed clutches, said speed clutches each having an input side and an output side, said engine having an intake passage, and a throttle valve arranged in said intake passage, the control system comprising:

accelerator position-detecting means for detecting release of said accelerator pedal;

command-issuing means for issuing a command instructing gear shifting of said automatic transmission;

neutral position-setting means responsive to said command issued by said command-generating means, for setting said automatic transmission into a neutral position when said accelerator position-detecting means detects said release of said accelerator pedal;

throttle valve opening control means for controlling opening of said throttle valve such that rotational speed of said output side of one of said speed clutches to be selected for said gear shifting and rotational speed of said input side thereof become substantially equal to each other, when said automatic transmission is held in said neutral position by said neutral position-setting means; and clutch control means operable upon detection that said rotational speed of said output side of said one of said speed clutches and said rotational speed of said input side thereof become substantially equal to each other, for engaging said one of said speed clutches.

2. A control system according to claim 1, wherein said clutch control means causes said one of said speed clutches to be engaged when a predetermined time period has elapsed after said detection that said rotational speed of said output side of said one of said speed clutches and said rotational speed of said input side thereof become substantially equal to each other.

3. A control system according to claim 1, wherein said neutral position-setting means instantly sets said automatic transmission into said neutral position by releasing hydraulic pressure applied to one of said speed clutches which is currently selected, when said command is issued by said command-issuing means.

4. A control system according to claim 1, wherein said clutch control means instantly causes said one of said speed clutches to be engaged by applying hydraulic pressure thereto when said predetermined time period has elapsed.

* * * * *